US010826259B2

(12) United States Patent
Lo

(10) Patent No.: US 10,826,259 B2
(45) Date of Patent: Nov. 3, 2020

(54) AUTOMATIC WIRE ARRANGING DEVICE

(71) Applicant: Cheng Uei Precision Industry Co., Ltd., New Taipei (TW)

(72) Inventor: Sheng Chieh Lo, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 268 days.

(21) Appl. No.: 15/979,522

(22) Filed: May 15, 2018

(65) Prior Publication Data

US 2019/0356099 A1 Nov. 21, 2019

(51) Int. Cl.

*B23P 19/00* (2006.01)
*H01R 43/02* (2006.01)
*H01B 13/00* (2006.01)
*H01B 7/36* (2006.01)

(52) U.S. Cl.

CPC ..... *H01R 43/0263* (2013.01); *H01B 13/0036* (2013.01); *H01B 7/361* (2013.01); *H01B 7/363* (2013.01)

(58) Field of Classification Search

CPC .. H01B 13/0036; G06K 9/00624; G06K 9/20; B23K 2101/32; B23K 3/087; B25B 11/02
See application file for complete search history.

(56) References Cited

U.S. PATENT DOCUMENTS 4,559,702 A * 12/1985 Maack .................. H01R 43/28 198/477.1
2019/0358723 A1* 11/2019 Lee .................... G06K 9/00624

* cited by examiner

*Primary Examiner* — Paul D Kim
(74) *Attorney, Agent, or Firm* — Lin & Associates Intellectual Property, Inc.

(57) ABSTRACT

An automatic wire arranging device includes a controller, at least one driving device electrically connected with the controller, a wire clamping jig, a wire arranging rotor, at least one charge-coupled device camera and a puncher pin. The wire clamping jig is connected with the at least one driving device. The wire arranging rotor has a spindle, and a cylinder-shaped base portion fastened to a tail end of the spindle. An outer side surface of the base portion is equipped with a plurality of clamping portions. The plurality of the clamping portions are used for clamping a plurality of different characteristic core wires. The wire arranging rotor is connected with the at least one driving device. The at least one charge-coupled device camera faces towards the wire clamping jig and is connected with the controller. The puncher pin is movably disposed above the wire clamping jig.

9 Claims, 6 Drawing Sheets

AUTOMATIC WIRE ARRANGING DEVICE

BACKGROUND OF THE INVENTION

1. Field of the Invention

The present invention generally relates to a wire arranging device, and more particularly to an automatic wire arranging device and an automatic wire arranging method applied in the automatic wire arranging device.

2. The Related Art

Generally, when a conventional cable having multiple core wires proceed spot soldering, colors of the core wires are all distinguished by eyes of workers, and the core wires are manually placed to corresponding clamping slots of a wire arranging jig according to the colors of the core wires separately, then the core wires are spot soldered one by one. However, because the workers are easily tired and distinguish the colors wrongly, the core wires are pressed into wrong positions and the wrongly soldered core wires are increased to make rates of repairing and even scrapping the core wires high. In addition, in a process of arranging the core wires, more workers are needed and working hours are increased. As a result, a cost of spot soldering the core wires of the conventional cable is higher.

SUMMARY OF THE INVENTION

An object of the present invention is to provide an automatic wire arranging device for proceeding automatically arranging a plurality of different characteristic core wires of a cable. The automatic wire arranging device includes a controller, at least one driving device electrically connected with the controller, a wire clamping jig, a wire arranging rotor, at least one charge-coupled device camera and a puncher pin. A top surface of the wire clamping jig opens a plurality of clamping slots arranged transversely. The wire clamping jig is connected with the at least one driving device. The at least one driving device is capable of driving the wire clamping jig to perform transverse reciprocating movements. The wire arranging rotor has a spindle, and a cylinder-shaped base portion fastened to a tail end of the spindle. An outer side surface of the base portion is equipped with a plurality of clamping portions arranged as a semicircle shape. The plurality of the clamping portions are used for clamping the plurality of the different characteristic core wires which need arranging separately. The wire arranging rotor is connected with the at least one driving device. The at least one driving device is capable of driving the wire arranging rotor to move in an up-down direction, a transverse direction and an anterior-posterior direction. The at least one driving device is still capable of driving the spindle to rotate in a preset angle and driving the spindle to rotate in a forward direction or a reverse direction. The at least one charge-coupled device camera faces towards the wire clamping jig and is connected with the controller. The at least one charge-coupled device camera is capable of distinguishing different characteristics of each of the plurality of the core wires. The puncher pin is movably disposed above the wire clamping jig. The at least one driving device is connected with and drives the puncher pin. The puncher pin is capable of performing up-down reciprocating movements with respect to the wire clamping jig. The controller controls the cylinder driver to drive the puncher pin to move downward to push against each of the plurality of the core wires corresponding to the puncher pin to move downward and to be blocked in one of the plurality of the clamping slots.

Another object of the present invention is to provide an automatic wire arranging method applied in an automatic wire arranging device to arrange a plurality of different characteristic core wires of a cable. Specific steps of the automatic wire arranging method are described hereinafter. The wire arranging device includes a wire clamping jig, a wire arranging rotor, at least one charge-coupled device camera facing towards the wire clamping jig, and a puncher pin movably disposed above the wire clamping jig. The puncher pin is located adjacent to and spaced from one side of the wire arranging rotor. The wire arranging rotor has a spindle, and a cylinder-shaped base portion fastened to the spindle. An outer side surface of the base portion is equipped with a plurality of clamping portions. Clamp the plurality of the different characteristic core wires artificially in the plurality of clamping portions, separately. Move the wire arranging rotor and the plurality of the different characteristic core wires to the wire clamping jig. Distinguish the different characteristic core wires to determine preset arranging positions of the puncher pin by the at least one charge-coupled device camera so as to press downward the core wires to the wire clamping jig. Raise the puncher pin to complete fastening the plurality of the different characteristic core wires.

Another object of the present invention is to provide an automatic wire arranging device for automatically arranging a plurality of different characteristic core wires. The automatic wire arranging device includes a wire clamping jig opening a plurality of clamping slots arranged transversely, a wire arranging rotor, and a puncher pin movably disposed above the wire clamping jig. The wire arranging rotor is equipped with a plurality of clamping portions. The plurality of the clamping portions are used for clamping the plurality of the different characteristic core wires separately. The wire arranging rotor is rotated to make one of the plurality of the core wires aligned with one of the plurality of the clamping slots, the puncher pin pushes the one of the plurality of the core wires into the one of the clamping slots.

As described above, when the automatic wire arranging device is in use, operators are capable of blocking the plurality of the different characteristic core wires which need arranging in the plurality of the corresponding clamping portions at will, the controller, the wire clamping jig, the wire arranging rotor and the puncher pin cooperate with one another to realize automatically distinguishing different characteristics, including colors of the plurality of the core wires to arrange the plurality of the different characteristic core wires in the plurality of the corresponding clamping slots separately, so that less workers are needed to save manpower and working hours are decreased, speeds of the automatic wire arranging device arranging the plurality of the different characteristic core wires of the cable are improved and defect rates of the automatic wire arranging device arranging the plurality of the different characteristic core wires of the cable are lowered. As a result, a cost of spot soldering the different characteristic core wires of the cable is lower.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
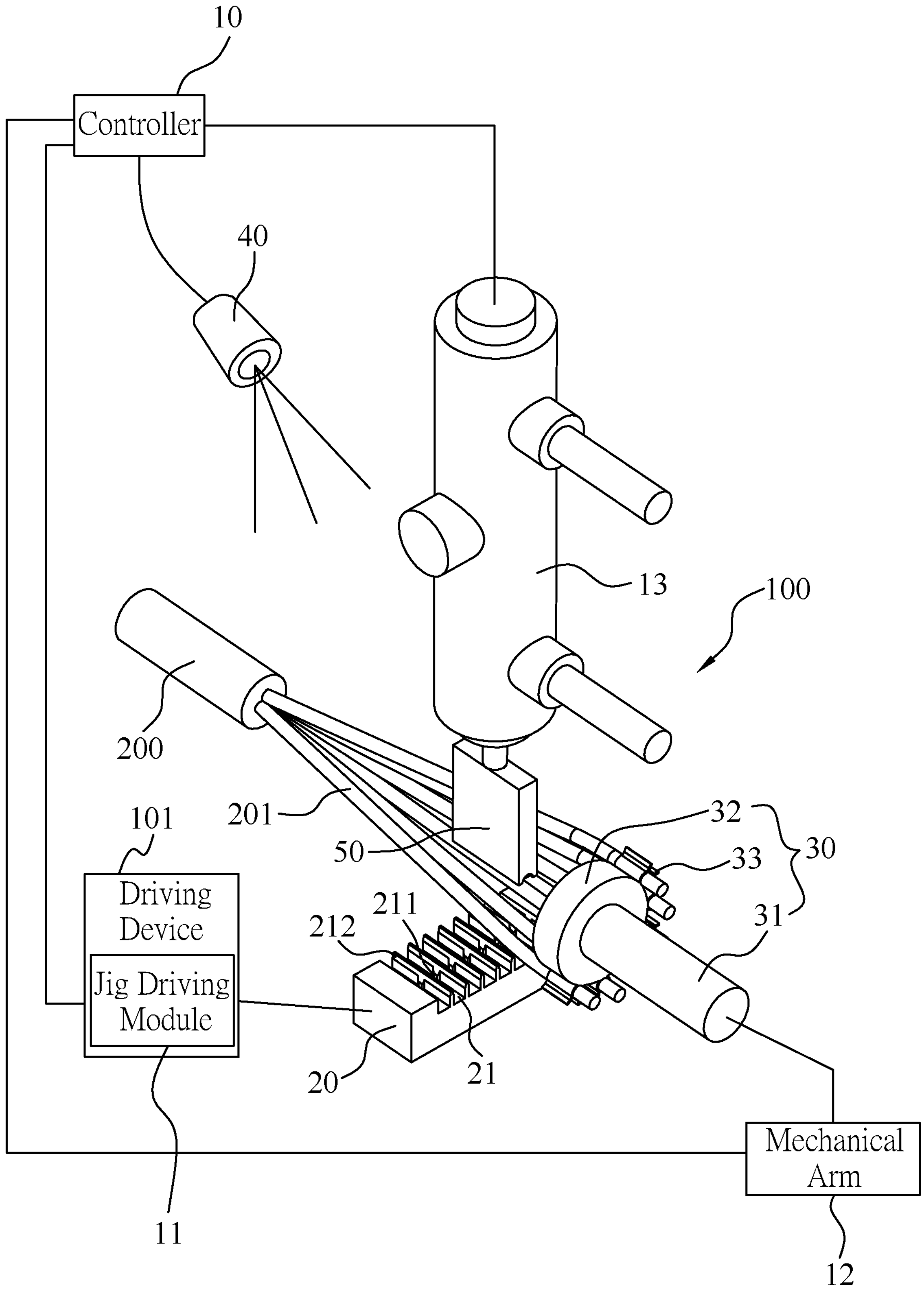
FIG. 1 is a diagrammatic drawing of an automatic wire arranging device in accordance with a first preferred embodiment of the present invention.

With reference to FIG. 1, an automatic wire arranging device 100 in accordance with a first preferred embodiment of the present invention is shown. The automatic wire arranging device 100 is used for proceeding automatically arranging a plurality of different characteristic core wires 201 of a cable 200. Each of the plurality of the core wires 201 has different characteristics. The different characteristics of each of the plurality of the core wires 201 include a contour of each of the plurality of the core wires 201, a diameter of each of the plurality of the core wires 201 and color information of each of the plurality of the core wires 201. In the first preferred embodiment, the automatic wire arranging device 100 is used for proceeding automatically arranging a plurality of different-colored core wires 201 of the cable 200. The automatic wire arranging device 100 includes a controller 10, at least one driving device 101, a wire clamping jig 20, a wire arranging rotor 30, at least one charge-coupled device (CCD) camera 40 and a puncher pin 50.

Referring to FIG. 1 again, the at least one driving device 101 is electrically connected with the controller 10. In the first preferred embodiment, the at least one driving device 101 includes a jig driving module 11, a mechanical arm 12 and a cylinder driver 13. The jig driving module 11, the mechanical arm 12 and the cylinder driver 13 are electrically connected with the controller 10.

Figure 2:
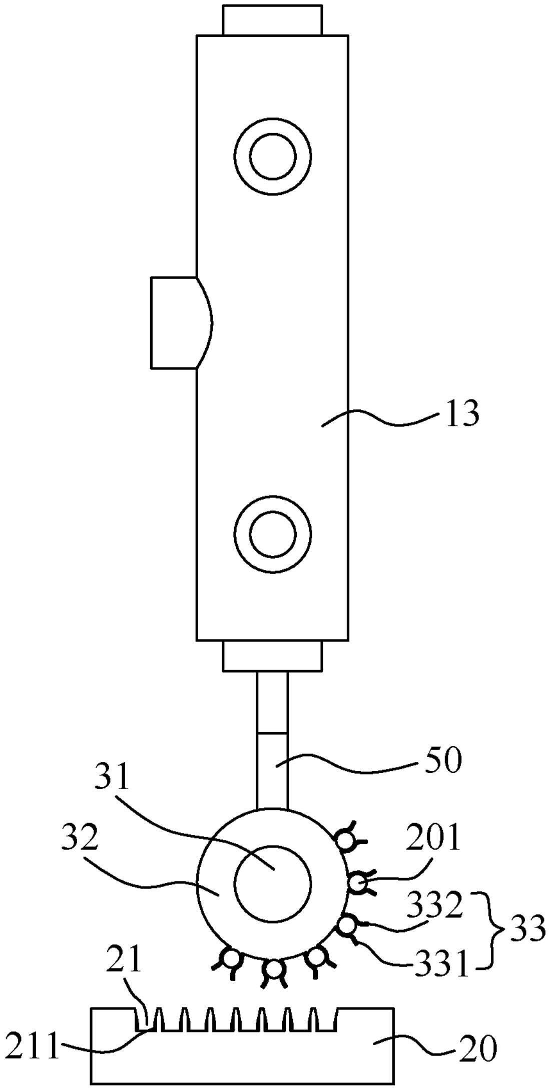
FIG. 2 is a front view of the automatic wire arranging device of FIG. 1.

Referring to FIG. 1 and FIG. 2, the wire clamping jig 20 is connected with the jig driving module 11 of the at least one driving device 101. The jig driving module 11 of the at least one driving device 101 is capable of driving the wire clamping jig 20 to perform transverse reciprocating movements and is capable of driving the wire clamping jig 20 to perform anterior-posterior reciprocating movements. When the wire clamping jig 20 performs the anterior-posterior reciprocating movements, a few operations corresponding to an automatic soldering process are able to be reached. For example, the wire clamping jig 20 is moved to a soldering position. In the first preferred embodiment, the jig driving module 11 is a stepper motor. The wire clamping jig 20 is of a rectangular board shape. A top surface of the wire clamping jig 20 opens a plurality of clamping slots 21 arranged transversely. Each of the plurality of the clamping slots 21 extends in the anterior-posterior direction. Two facing inner surfaces of two side walls of each of the plurality of the clamping slots 21 protrude towards each other to form two protruding portions 211. Upper portions of the two facing inner surfaces of the two side walls of each of the plurality of the clamping slots 21 slantwise extend outward away from each other to form two guiding slopes 212. A distance between tops of the two guiding slopes 212 of each of the plurality of the clamping slots 21 is wider than bottoms of the two guiding slopes 212 of each of the plurality of the clamping slots 21.

Figure 3:
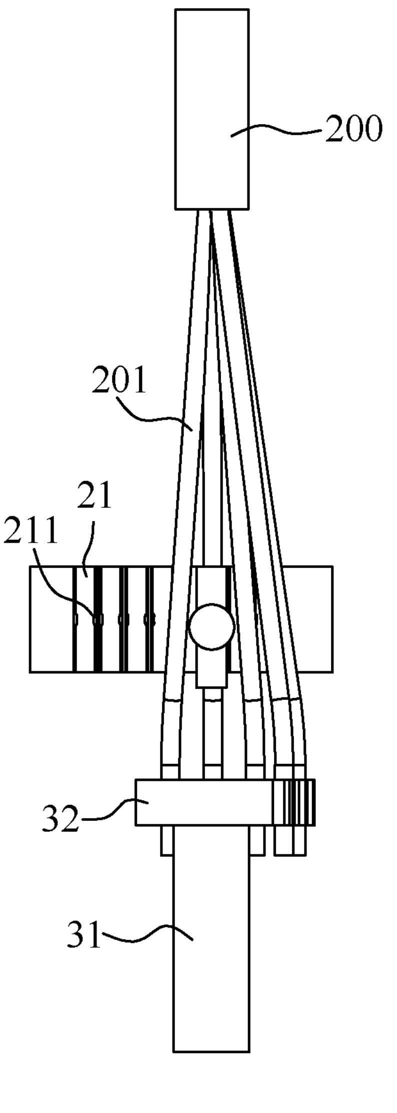
FIG. 3 is a top view of the automatic wire arranging device of FIG. 1.

Referring to FIG. 1 to FIG. 3, the wire arranging rotor 30 has a spindle 31, and a cylinder-shaped base portion 32 fastened to a tail end of the spindle 31. An outer side surface of the base portion 32 is equipped with a plurality of clamping portions 33. The plurality of the clamping portions 33 are arranged as a semicircle shape. The plurality of the clamping portions 33 are used for clamping the plurality of the different characteristic core wires 201 which need arranging separately. Each of the plurality of the clamping portions 33 includes a resilient S-shaped first clamping arm 331 protruded outward from the outer side surface of the base portion 32, and a resilient S-shaped second clamping arm 332 disposed opposite to the first clamping arm 331. Each of the different characteristic core wires 201 which need arranging is clamped between the first clamping arm 331 and the second clamping arm 332 of one of the plurality of the clamping portions 33. The wire arranging rotor 30 is connected with the at least one driving device 101. In the first preferred embodiment, the spindle 31 of the wire arranging rotor 30 is fastened to the mechanical arm 12. The mechanical arm 12 of the at least one driving device 101 is capable of driving the wire arranging rotor 30 to move in an up-down direction, a transverse direction and an anterior-posterior direction. The mechanical arm 12 of the at least one driving device 101 is still capable of driving the spindle 31 to rotate in a preset angle and driving the spindle 31 to rotate in a forward direction or a reverse direction.

Figure 4:
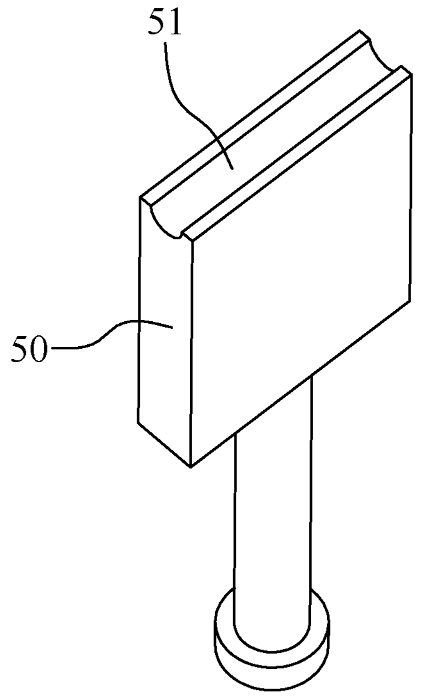
FIG. 4 is a stereogram showing a puncher pin of the automatic wire arranging device of FIG. 1.
Figure 5:
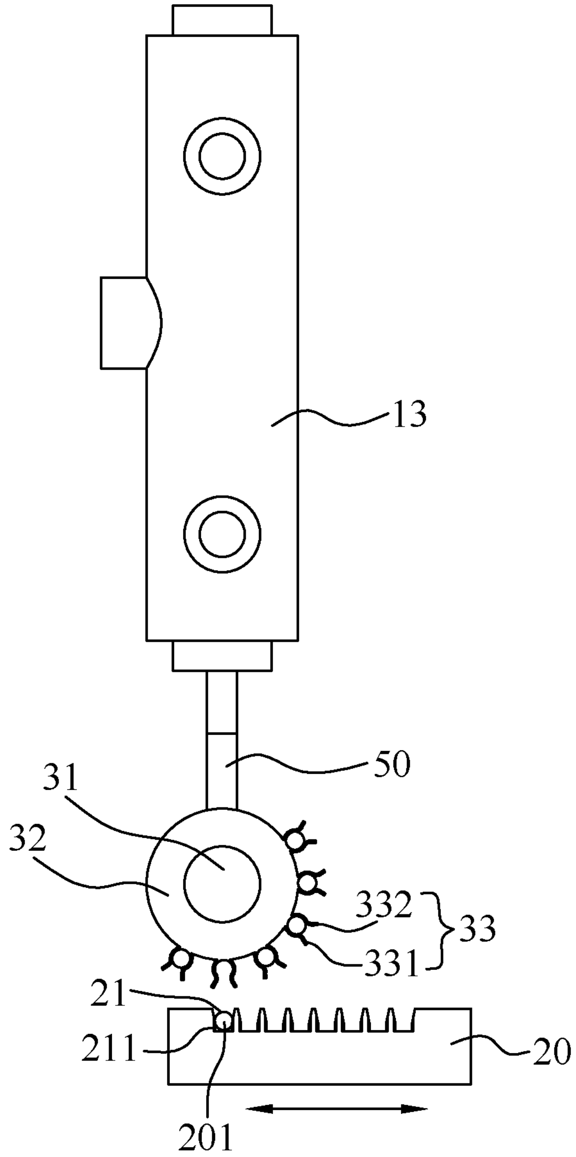
FIG. 5 is a diagrammatic drawing of a wire arranging process of the automatic wire arranging device in accordance with the present invention.
Figure 6:
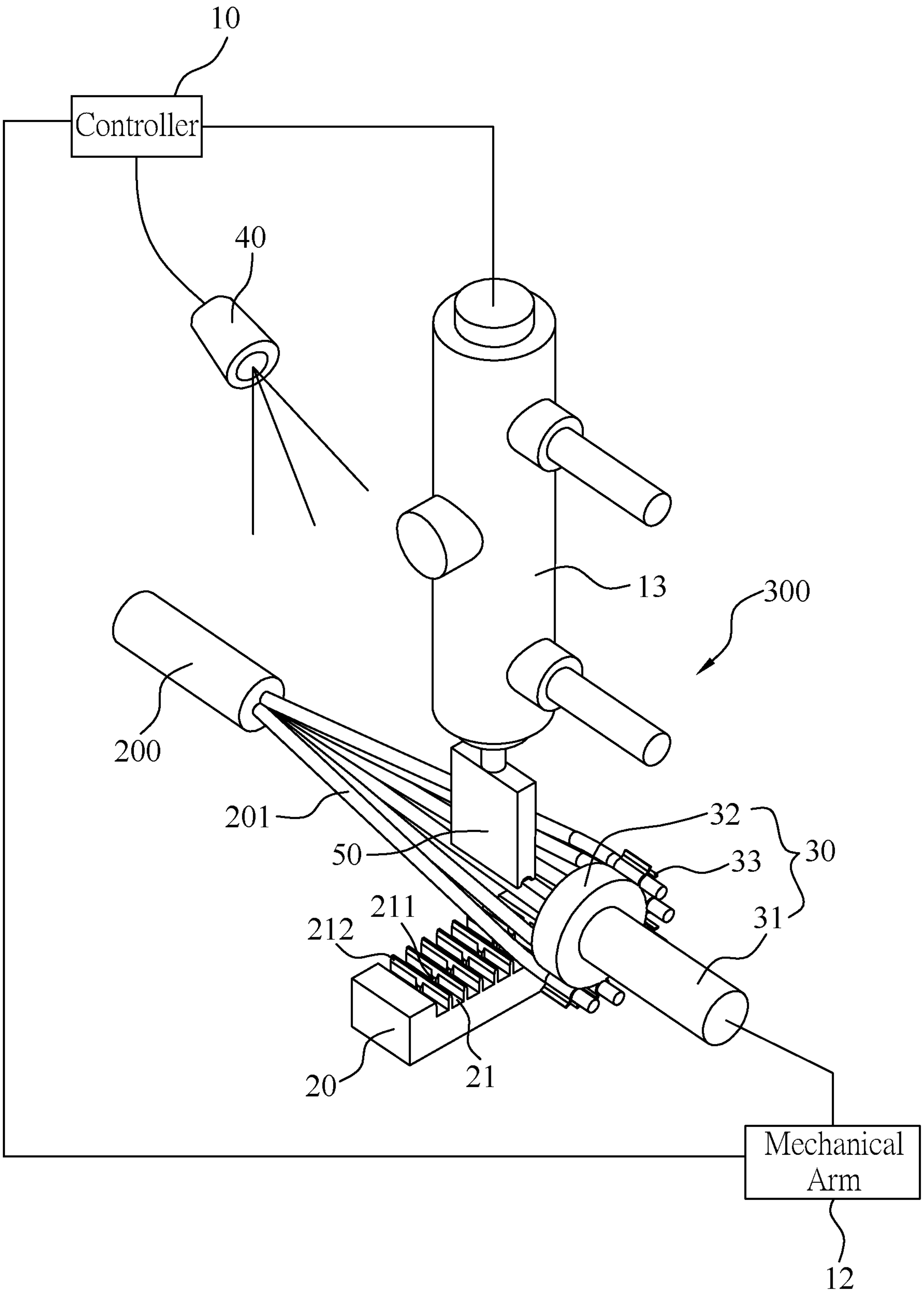
FIG. 6 is a diagrammatic drawing of an automatic wire arranging device in accordance with a second preferred embodiment of the present invention.

Referring to FIG. 1, FIG. 2 and FIG. 4, the at least one charge-coupled device camera 40 faces towards the wire clamping jig 20 and is connected with the controller 10. The at least one charge-coupled device camera 40 is capable of distinguishing different characteristics of each of the plurality of the core wires 201 to determine preset arranging positions of the puncher pin 50. The puncher pin 50 is movably disposed above the wire clamping jig 20. The puncher pin 50 is disposed to a top of the wire clamping jig 20. The cylinder driver 13 of the at least one driving device 101 is connected with and drives the puncher pin 50, so that the puncher pin 50 is capable of performing up-down reciprocating movements with respect to the wire clamping jig 20. A bottom surface of the puncher pin 50 is recessed upward to form a limiting slot 51 extending in the anterior-posterior direction. The limiting slot 51 extends in a direction parallel with an extension direction of each of the plurality of the clamping slots 21. The limiting slot 51 is matched with each of the plurality of the clamping slots 21.

Referring to FIG. 1 to FIG. 5, a working process of the automatic wire arranging device 100 applies an automatic wire arranging method to arrange the plurality of the different-colored core wires 201 of the cable 200 is described as follows. The plurality of the different-colored core wires 201 of the cable 200 are artificially clamped in the plurality of the clamping portions 33, separately. Each of the plurality of the different-colored core wires 201 of the cable 200 is fastened by virtue of the first clamping arm 331 and the second clamping arm 332 which are opposite to each other. Each of the plurality of the different-colored core wires 201 of the cable 200 is fastened between the first clamping arm 331 and the second clamping arm 332 which are opposite to each other. The wire arranging rotor 30 and the plurality of the different-colored core wires 201 are moved to the wire clamping jig 20. Specifically, after the plurality of the different-colored core wires 201 of the cable 200 are all fastened, the controller 10 controls the mechanical arm 12 to drive the wire arranging rotor 30 to make the clamped core wires 201 move between the wire clamping jig 20 and the puncher pin 50. The puncher pin 50 is located adjacent to and spaced from one side of the wire arranging rotor 30. The puncher pin 50 is disposed over an axle center of the wire arranging rotor 30. The jig driving module 11 which is the stepper motor drives the wire clamping jig 20 to move until the clamping slot 21 of an outermost end (a leftmost end or a rightmost end) of the wire clamping jig 20 is located under the puncher pin 50 and is corresponding to the limiting slot 51.

The at least one charge-coupled device camera 40 distinguishes the different characteristics of each of the plurality of the different characteristic core wires 201 to determine the preset arranging positions of the puncher pin 50 so as to press downward the core wires 201 to the plurality of the clamping slots 21 of the wire clamping jig 20. Specifically, the at least one charge-coupled device (CCD) camera 40 takes the plurality of the core wires 201 of the cable 200 located above the wire clamping jig 20 and clamped in the plurality of the clamping portions 33 separately, and the color information of each of the plurality of the core wires 201 of the cable 200 is transmitted to the controller 10. The controller 10 controls the mechanical arm 12 to rotate according to preset programs (set which colors of the plurality of the core wires 201 are mounted in the plurality of the clamping slots 21 separately in sequence), so that each of the core wires 201 with the corresponding color is rotated under the puncher pin 50, tail ends of the corresponding first clamping arm 331 and the corresponding second clamping arm 332 are just corresponding to one of the plurality of clamping slots 21. The controller 10 controls the cylinder driver 13 to drive the puncher pin 50 to move downward to push against each of the plurality of the core wires 201 corresponding to the puncher pin 50 to move downward so as to break away from the first clamping arm 331 and the second clamping arm 332 of one of the clamping portions 33 and to be blocked in the one of the plurality of the clamping slots 21.

The plurality of the core wires 201 are still able to be guided to the plurality of the clamping slots 21 separately and accurately under a condition of the core wires 201 having certain deformations by virtue of the guiding slopes 212 of the side walls of the plurality of the clamping slots 21. The plurality of the core wires 201 of the cable 200 are capable of being blocked in the plurality of the clamping slots 21 separately and steadily by virtue of the two protruding portions 211 protruded from the two side walls of each of the plurality of the clamping slots 21 for preventing the plurality of the core wires 201 of the cable 200 from falling off. The protruding portions 211 of the plurality of the clamping slots 21 rub against the plurality of the core wires 201 separately. After the clamping slot 21 of the outermost end of the wire clamping jig 20 is corresponding to and clamps one of the plurality of the core wires 201, the controller 10 controls the cylinder driver 13 to drive the puncher pin 50 to move upward to an original position. Then, the jig driving module 11 which is the stepper motor drives the wire clamping jig 20 to move to make the clamping slot 21 of a secondary outer end of the wire clamping jig 20 located under the puncher pin 50. In this way, the plurality of the different-colored core wires 201 proceed being arranged in the clamping slot 21 of the secondary outer end and other clamping slots 21 of the wire clamping jig 20 in sequence, so that the plurality of the different-colored core wires 201 complete being arranged according to the preset arranging positions separately. The puncher pin 50 is raised to complete fastening the plurality of the different-colored core wires 201.

Specific steps of the automatic wire arranging method applied in the automatic wire arranging device 100 to arrange the plurality of the different characteristic core wires 201 of the cable 200 are described as follows. Firstly, clamp the plurality of the different characteristic core wires 201 artificially in the plurality of clamping portions 33, separately. Secondly, move the wire arranging rotor 30 and the plurality of the different characteristic core wires 201 to the wire clamping jig 20. Thirdly, distinguish the plurality of the different characteristic core wires 201 to determine the preset arranging positions of the puncher pin 50 by the at least one charge-coupled device camera 40 so as to press downward the plurality of the core wires 201 to the wire clamping jig 20. Fourthly, raise the puncher pin 50 to complete fastening the plurality of the different characteristic core wires 201.

Referring to FIG. 1 to FIG. 6, an automatic wire arranging device 300 in accordance with a second preferred embodiment of the present invention is shown. Differences between the automatic wire arranging device 300 in accordance with the second preferred embodiment and the automatic wire arranging device 100 in accordance with the first preferred embodiment are described as follows. The wire clamping jig 20 is immovable. The wire arranging rotor 30 is rotated to make the one of the plurality of the core wires 201 aligned with the puncher pin 50, and then the puncher pin 50 and the wire arranging rotor 30 with the one of the plurality of the core wires 201 are moved and aligned with the one of the plurality of the clamping slots 21. Therefore, at least one of the puncher pin 50, the wire clamping jig 20 and the wire arranging rotor 30 is moved to make the puncher pin 50 and the one of the plurality of the core wires 201 aligned with the one of the plurality of the clamping slots 21, and the puncher pin 50 pushes the one of the plurality of the core wires 201 into the one of the clamping slots 21. Specific steps of the automatic wire arranging method applied in the automatic wire arranging device 100 in accordance with the first preferred embodiment are different from specific steps of an automatic wire arranging method applied in the automatic wire arranging device 300 in accordance with the second preferred embodiment.

In addition, the plurality of the core wires 201 with the different characteristics are automatically clamped in the plurality of the clamping portions 33 separately by the mechanical arm 12. The at least one charge-coupled device (CCD) camera 40 is able to be replaced by a complementary metal oxide semiconductor (CMOS) camera.

As described above, when the automatic wire arranging device 100 is in use, operators are capable of blocking the plurality of the different characteristic core wires 201 which need arranging in the plurality of the corresponding clamping portions 33 at will, the controller 10, the wire clamping jig 20, the wire arranging rotor 30 and the puncher pin 50 cooperate with one another to realize automatically distinguishing the different characteristics, including the colors of the plurality of the core wires 201 to arrange the plurality of the different characteristic core wires 201 in the plurality of the corresponding clamping slots 21 separately, so that less workers are needed to save manpower and working hours are decreased, speeds of the automatic wire arranging device 100 arranging the plurality of the different characteristic core wires 201 of the cable 200 are improved and defect rates of the automatic wire arranging device 100 arranging the plurality of the different characteristic core wires 201 of the cable 200 are lowered. As a result, a cost of spot soldering the different characteristic core wires 201 of the cable 200 is lower.

What is claimed is:

1. An automatic wire arranging device for proceeding automatically arranging a plurality of different characteristic core wires of a cable, comprising:

a controller;

at least one driving device electrically connected with the controller;

a wire clamping jig, a top surface of the wire clamping jig opening a plurality of clamping slots arranged transversely, the wire clamping jig being connected with the at least one driving device, the at least one driving device being capable of driving the wire clamping jig to perform transverse reciprocating movements;

a wire arranging rotor having a spindle, and a cylinder-shaped base portion fastened to a tail end of the spindle, an outer side surface of the base portion being equipped with a plurality of clamping portions arranged as a semicircle shape, the plurality of the clamping portions being used for clamping the plurality of the different characteristic core wires which need arranging separately, the wire arranging rotor being connected with the at least one driving device, the at least one driving device being capable of driving the wire arranging rotor to move in an up-down direction, a transverse direction and an anterior-posterior direction, the at least one driving device being still capable of driving the spindle to rotate in a preset angle and driving the spindle to rotate in a forward direction or a reverse direction;

at least one charge-coupled device camera facing towards the wire clamping jig and being connected with the controller, the at least one charge-coupled device camera being capable of distinguishing different characteristics of each of the plurality of the core wires; and a puncher pin movably disposed above the wire clamping jig, the at least one driving device being connected with and driving the puncher pin, the puncher pin being capable of performing up-down reciprocating movements with respect to the wire clamping jig, wherein the controller controls the cylinder driver to drive the puncher pin to move downward to push against each of the plurality of the core wires corresponding to the puncher pin to move downward and to be blocked in one of the plurality of the clamping slots.

2. The automatic wire arranging device as claimed in claim 1, wherein the at least one driving device includes a jig driving module, the wire clamping jig is connected with the jig driving module, the jig driving module is capable of driving the wire clamping jig to perform the transverse reciprocating movements and is capable of driving the wire clamping jig to perform anterior-posterior reciprocating movements.

3. The automatic wire arranging device as claimed in claim 2, wherein the jig driving module is a stepper motor.

4. The automatic wire arranging device as claimed in claim 1, wherein two facing inner surfaces of two side walls of each of the plurality of the clamping slots protrude towards each other to form two protruding portions, the plurality of the core wires are capable of being blocked in the plurality of the clamping slots separately and steadily by virtue of the two protruding portions protruded from the two side walls of each of the plurality of the clamping slots, the protruding portions of the plurality of the clamping slots rub against the plurality of the core wires separately.

5. The automatic wire arranging device as claimed in claim 1, wherein the different characteristics of each of the plurality of the core wires include a contour of each of the plurality of the core wires, a diameter of each of the plurality of the core wires and color information of each of the plurality of the core wires.

6. The automatic wire arranging device as claimed in claim 1, wherein the at least one driving device includes a mechanical arm, the spindle of the wire arranging rotor is fastened to the mechanical arm.

7. The automatic wire arranging device as claimed in claim 1, wherein each of the plurality of the clamping portions includes a resilient S-shaped first clamping arm protruded outward from the outer side surface of the base portion, and a resilient S-shaped second clamping arm disposed opposite to the first clamping arm, each of the different characteristic core wires which need arranging is clamped between the first clamping arm and the second clamping arm of one of the plurality of the clamping portions.

8. The automatic wire arranging device as claimed in claim 1, wherein the at least one driving device includes a cylinder driver, the cylinder driver is connected with and drives the puncher pin.

9. The automatic wire arranging device as claimed in claim 1, wherein a bottom surface of the puncher pin is recessed upward to form a limiting slot extending in the anterior-posterior direction, the limiting slot is matched with each of the clamping slots.

* * * * *